3,812,208
Patented May 21, 1974

3,812,208
STRUCTURAL ELEMENTS OF REDUCED INFLAMMABILITY
Franz Esser, Gundernhausen, Friedrich Hanstein, Gross-Zimmern, and Ludwig Hosch and Dieter Mueller, Darmstadt, Germany, assignors to Rohm GmbH, Darmstadt, Germany
No Drawing. Continuation-in-part of abandoned application Ser. No. 9,253, Sept. 2, 1969. This application July 1, 1971, Ser. No. 159,031
Claims priority, application Germany, Aug. 31, 1968, P 17 94 058.8
Int. Cl. B29c 25/00; C09k 3/28
U.S. Cl. 260—899                 9 Claims

ABSTRACT OF THE DISCLOSURE

Structural elements, such as for buildings, made of acrylates having enhanced flame resistance, said acrylates being mechanically worked, e.g. biaxially stretched, and having flame-inhibiting phosphorus compounds incorporated therein.

---

This application is a continuation-in-part of application Ser. No. 9,253, filed Sept. 2, 1969, now abandoned.

The present invention relates to structural elements, made of acrylic based plastics, having reduced inflammability. More in particular, this invention relates to such acrylate structural elements of reduced inflammability which are biaxially stretched and which have a flame-inhibiting phosphorus compound incorporated therein.

Structural elements made of acrylic glass, for instance light domes, wall and balcony coverings, roof coverings, portholes for ships and the like have the disadvantage that they can burn. This disadvantage can be reduced to a certain extent by incorporating flame-inhibiting additives, particularly phosphorus compounds, into the plastic.

For example, in accordance with British Pat. 996,914, the inflammability of acrylate plastics is reduced by the addition thereto of acid phosphoric acid esters, predominantly primary and secondary esters of o-phosphoric acid and of phosphorous acid, primary esters of hypophosphoric acid, and acid esters of pyrophosphoric acid.

In accordance with U.S. Pat. 3,030,327, the addition of 0.5 to about 20 percent by weight of a phosphoric acid also results in a reduction of the inflammability of polyacrylates; the examples describe the production of possibly crosslinked polymethyl methacrylate, copolymers of methyl methacrylate, and a copolymer consisting predominantly of acrylonitrile and the balance methyl methacrylate, in the presence of o-phosphoric acid or pyrophosphoric acid.

In accordance with French Pat. 1,109,057, halogen compounds such as hexachlorethane mixed with, for instance, tricresyl phosphate are used to reduce inflammability.

The phosphoric acid polyesters described in U.S. Pat. 3,014,944, and particularly halogen-containing compounds of this type such as tris-(β-chloroethyl)-phosphate, tris-(dichlorpropyl)-phosphate, or tris-(dibromopropyl)-phosphate, result in a reduction of the inflammability of plastics, as pointed out in "Trans. J. Plastics Inst." (December 1965), pp. 247 et seq. U.S. Pat. 3,347,-818 also teaches the use of halogen substituted acid alkyl esters of o-phosphoric acid, alone or in combination with phosphonates or phosphates, as additives in flame-resistant acrylate compositions.

The incorporation of polymerizable derivatives of phosphorous acid, for instance of β-methacryloxy ethyl phosphorous acid or methacryloxy-2-chloromethyl ethyl phosphorous acid, into plastics consisting entirely or predominantly of methacrylates is also known (German Pat. 1,134,836). The inflammability of such products is reduced by the said additions. Phosphonates, for instance diallyl phenyl phosphonate, are also known as additives for synthetic polymers to reduce their inflammability.

U.S. Pat. 3,468,980 teaches the use of polymeric phosphites, phosphates, or phosphonates, which polymers may also contain halogen such as bromine or chlorine, as flame-inhibiting additives for acrylates.

U.S. Pat. 3,312,636 teaches flame-inhibiting phosphorus polymers of the formula

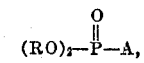

wherein A is

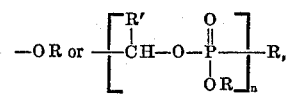

and R is haloalkyl containing 2 or 3 carbon atoms and 1 or 2 chlorine or bromine atoms, R' is hydrogen or alkyl having 1–3 carbon atoms, and n is an integer from 1 to 3. Various polymers of this type are commercially available under the trade name "Phosgard," an example of which is the mixed polyphosphate principally comprising

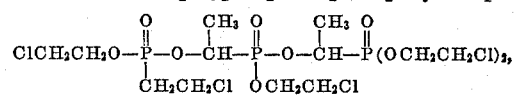

sold under the trade name "Phosgard C-22-R," having an approximate molecular weight of 611.

Any of the numerous known flame-inhibiting phosphorus compounds can be used according to the present invention. However, preferred compounds are phosphoric, phosphorous, and phosphonic acids and their esters. Known flame-inhibiting esters include aromatic esters, such as tricresylphosphate; aliphatic esters, such as β-methacryloxy-ethyl phosphorous acid, including unsaturated aliphatic esters such as diallylphenylphosphate and alkyl esters such as monoethylphosphate. Other preferred phosphorus compounds are the halo lower alkyl phosphates such as tris-2-bromoethyl phosphate, trichloroethyl phosphate, trischloropropyl phosphate, and tris-2,3-dibromopropyl- and tris - 2,3 - dichloropropyl-phosphate. Finally, the "Phosgard" polymers of the structure

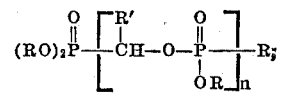

wherein R and R' are as hereinbefore defined, are preferred additives.

Numerous halogen compounds are also known as flame-inhibiting additives in plastics. Mention may be made of organic acid chlorides; tetrachlorphthalates; hexachlorcyclopentadiene, possibly in combination with antimony chloride; tetrachlorosuccindichloride; and reaction products of hexachlorethane with lead stearate. U.S. Pat. 3,093,599 teaches the addition of polymers containing halogen atoms, specifically the addition of brominated polybutadiene, to reduce the inflammability of plastics such as acrylates.

Although the inflammability of acrylic glass can be reduced by adding the aforementioned phosphorus-containing and/or halogen-containing compounds, and although the use of acrylic glass in building construction is possible under certain conditions as a result of it, the improvement in the burning behavior obtained in this manner is frequently insufficient under pertinent building regulations to permit the use of structural parts of acrylic glass.

According to the present invention, it has been found now that structural elements of acrylate based plastics become "difficultly inflammable" within the meaning of DIN Specification (German Industrial Standards) 4102 of the German Standards Committee, Sheet 4 (September 1965) when these elements:

(a) Contain a flame-inhibiting phosphorus compound of the kind discussed above in an amount such that the content of phosphorus, by weight of the acrylate plastic, is at least 0.8 percent; and (b) Consist of biaxially stretched material, the degree of stretch of which is 30 to 80 percent, or are prepared from such stretched material by shaping while in a thermoelastic state.

In a further embodiment of the present invention, structural elements of biaxially stretched acrylate containing a flame-inhibiting phosphorus compound, as described, additionally comprise halogen atoms, particularly chlorine or bromine atoms, preferably in an amount of at least 1.2 percent of chlorine, by weight of acrylate, or preferably in an amount of at least 2.5 percent of bromine, by weight of acrylate. When both chlorine and bromine atoms are present, the preferred minimum halogen content is proportional to the content of the respective halogens and can be expressed as percent of halogen, by weight of acrylate, by the linear relation $$1.2 + 0.013 Br,$$

where Br is the percent of bromine, by weight, in the combined amount of bromine and chlorine present in the acrylate.

The monoaxial and biaxial stretching of acrylic glasses in order to improve the mechanical properties of these plastics is known, e.g. from U.S. Pat. 2,856,634. The effects obtained by the stretching have been described in "Kunststoffe," 1962, Issue 4, pp. 174–181. The considerable improvements in elongation at rupture, bursting pressure, impact strength, specific energy of rupture and resistance to crack propagation obtained by the stretching process should be particularly mentioned.

The fact that the burning behavior of stretched material is also improved to a certain extent as compared with that of an unstretched acrylic glass is a new discovery.

The reduction in the burnability obtained by stretching alone is, however, not sufficient to enable the use of structural elements of such material for those purposes in which, in accordance with the definition of the said DIN Specification, "difficultly inflammable" building materials are required.

Within the meaning of the aforementioned 1965 DIN Specification (i.e. German Industrial Standards), burnable building materials are classified into "difficultly inflammable building materials (Class B 1)," "normally inflammable building materials (Class B 2)," and "easily inflammable building materials (Class B 3)." As examples of building materials of Class B 1, there may be mentioned lightweight building boards comprising wood shavings bonded with inorganic binders and impregnated with flame-inhibiting agents in accordance with DIN 1101. As examples of building materials of Class B 2, mention may be made of wood and wood materials of a thickness of more than 2 mm. and standardized roofing papers. As examples of building materials of Class B 3, paper, straw, wood shavings, and wood up to a thickness of 2 mm. may be mentioned. Within the meaning of these definitions, acrylic glasses, including also those types containing flame-inhibiting additives which are available on the market, are "normally inflammable materials" falling under Class B 2. The aforementioned reduction in burnability obtained by the stretching of acrylic glasses is not by itself sufficient to classify the stretched acrylate plastics in Class B 1.

It must be considered surprising that by the two means, namely stretching and the incorporation of known flame-inhibiting agents, particularly phosphorus-containing flame-inhibiting agents, the burnability of acrylate plastics is reduced to such an extent that these are to be classified as "difficultly inflammable" within the meaning of the said DIN Specification, so that there are no objections to the use of structural elements made therefrom even when these are used in the form of continuous large surfaces, for instance for covering the facades of high structures or as light domes for covering factory buildings, athletic stadiums, and the like. The effect obtained in accordance with the invention could not be predicted as the sum of two individual effects, particularly as the improvement in the burning behavior obtained by stretching was—as already mentioned—previously unknown.

The advance obtainable according to the present invention will be evident from the following comparative tests.

Domes were produced from plate-shaped acrylic glass of a size of 150 x 150 cm. in known manner. The thickness of the unstretched material was 4 mm. and that of the stretched panes 1.8 mm. The domes were placed on an aluminum frame and fastened with clamps. Four such domes lay in a square frame having a length of side of about 300 cm. The distance from the foot of the frame to the edge of the dome was 190 cm., and, to the zenith of the dome, 210 cm.

Below the domes a stack of firewood logs (about 2 x 2 x 80 cm.) was piled to a height of 50 cm. on a metal grid, below which gasoline was ignited in a pan, in its turn igniting the pile of wood. Without covering, the flames reached a height of 3 to 4 m., the pile burning for about ten minutes.

The following domes were tested on the said apparatus with respect to their burning behavior:

Dome 1 = ordinary commercial acrylic glass (polymethyl methacrylate);
Dome 2 = acrylic glass in which 3% by weight of phosphoric acid and 6% by weight of trichlorethyl phosphate had been incorporated;
Dome 3 = acrylic glass containing 16% of a chlorine-containing phosphoric acid polyester of the formula $$C_{14}H_{28}O_9P_3Cl_5$$

"Phosgard C–22–R");
Dome 4 = commercial acrylic glass (same as dome 1), of an original thickness of 4 mm., stretched biaxially by about 50% to have a thickness of 1.8 mm. and formed—while avoiding retraction—into a dome of the same dimensions as domes 1 to 3;
Dome 5 = stretched acrylic glass of a thickness of 1.8 mm. (same as dome 4) containing 3% of phosphoric acid and 6% of trichloroethyl phosphate;
Dome 6 = stretched acrylic glass of 1.8 mm. thickness (same as dome 4) containing 16% of the phosphorus polyester found in dome 3.

In the burning test, the individual domes showed the following behavior:

Dome 1 caught on fire after some time and burned. Parts of the dome fell burning in large pieces to the ground and burned there.

Dome 2 required about twice as long before it started to burn at the points or areas struck by the flames. As soon as the external flames no longer reached these areas, the fire extinguished after some time.

Dome 3 behaved similar to dome 2 but the areas burning ceased burning as soon as these were no longer struck by the external flames.

Dome 4 collapsed first of all at the point of impingement of the flames and later on caught on fire in the external flames, the heated part contracting. The shrunken body fell burning to the ground out of the mount.

Domes 5 and 6 behaved similarly to each other: the spherically shaped part sagged completely after three minutes and cracked apart forty seconds later. Despite strong action of the flame, the plastic did not ignite. After cracking apart, the material shrank together towards the edge so that the greatest part of the flames passed through the hole produced. In serious cases, the cracking of the dome would also be a desired effect, since in this way the occurrence of a strong heat accumulation would be avoided.

A repetition of the comparative tests under standardized conditions, i.e. a plate chimney method (DIN 4102), yielded the result that only the plastics from which domes 5 and 6 had been produced were to be considered "difficultly inflammable" within the meaning of DIN Specification 4102, Sheet 4 (September 1965). The ordinary acrylic glass, the stretched acrylic glass, and the acrylic glass containing flame-inhibiting additions were to be classified a "normally inflammable" within the meaning of the said Standard.

The heat of combustion of acrylic glass, 6400 Kcal./kg., is higher than that of resin-containing chip wood or of lignite briquettes and is approximately equal to that of gas coke. The use of this plastic for the covering of large facade surfaces was therefore contraindicated, as can be concluded from the comparative tests described above, even when the burnability of the plastic had been reduced in the previously known manner, i.e. by the addition of flame-inhibiting phosphorus compounds. However, when using structural elements according to the present invention, in case of fire propagation of the fire is practically entirely absent since, as the tests described have shown, the building elements, after possibly cracking apart at the most drastically deformed sections, shrink back without burning. In addition to this heat induced shrinking, the amount of material contained in structural elements of stretched acrylic glass is only a fraction of the quantity contained in equally large building elements made of unstretched material. As is known, the improved properties, earlier discussed herein, of stretched acrylate glass permit the use of thinner material than would be required for unstretched acrylate glass meeting the same mechanical requirements.

When using a material for the production of building elements, the resistance to weathering of said material is of decisive importance. It should be mentioned that the presence of phosphorus-containing flame-inhibiting agents produces an acrylic glass which does not have the excellent weathering properties of the ordinary polymethyl methacrylate plastics. However, by adding suitable stabilizers it is possible to obtain the resistance to weathering which is desired in external elements such as wall coverings and light domes. Such expedients are not, however, the object of the present invention.

When using phosphorus-containing flame retardants, the upper limit of the quantity of phosphorus contained in the plastic depends extensively on the compound by means of which phosphorus is introduced into the plastic. As mentioned above, many of the phosphorus compounds have a softening effect and/or impair the resistance of acrylates to weathering. Therefore, the quantity of compound used depends on its nature and on the intended use of the structural element. Only in exceptional cases will the amount of phosphorus exceed 3 percent by weight of the plastic.

As mentioned earlier, in a further embodiment of the present invention halogen atoms, specifically chlorine and/or bromine atoms, are incorporated into a biaxially stretched acrylate structural element containing a flame-inhibiting phosphorus compound. The halogen atoms may be incorporated into the acrylate in a number of ways, for example by copolymerization into the acrylate structure, as part of the flame-inhibiting phosphorus compound combined with the acrylate, or in compounds, particularly halogenated polymers, combined with the acrylate.

As comonomers suitable for incorporating halogen atoms into an acrylate polymer, the acrylate and methacrylate esters of chloro- and/or bromo-substituted phenols are of particular interest, as are vinyl chloride and vinylidene chloride. Suitable halophenyl acrylates and methacrylates include di- and tri-bromophenyl methacrylate, pentabromophenylacrylate and methacrylate, and trichlorophenyl acrylate.

Numerous flame-inhibiting phosphorus compounds which also contain chlorine and/or bromine atoms and which can be used to incorporate both phosphorus and halogen into an acrylate have already been mentioned, namely the halo lower alkyl phosphates such as trichloroethyl phosphate, tris-2-bromomethyl phosphate, tris-chloropropyl phosphate, tris-2,3-dibromopropyl- and tris-2,3-dichloropropyl-phosphate and the brominated and chlorinated "Phosgard" polymers.

Mixtures of these compounds can also be employed to introduce phosphorus and halogen into acrylates in the amounts specified as of interest, for example:

(a) About 10 percent by weight of "Phosgard C–22–R" and 5 percent by weight of tris-(dibromopropyl)-phosphate.

(b) About 15 percent by weight of "Phosgard C–22–R" and 5 percent by weight of tris-(1,3-dichloroisopropyl)-phosphate; or (c) About 10 percent by weight of tris-(dibromopropyl)-phosphate, and 10 percent by weight of tris-(1,3-dichloroisopropyl)-phosphate.

Polymers such as homopolymers and copolymers of vinyl chloride and vinylidene chloride can be blended with the acrylate plastics to introduce halogen atoms therein. Mention has already been made of U.S. 3,093,599 teaching the incorporation of brominated polymers into plastics such as acrylates for flame proofing.

On a weight basis, the amount of materials of these types incorporated in the polymer generally range from 10 to 20 percent, by weight of the acrylate.

The acrylate based plastics used in accordance with the present invention can be used both as organic glass, i.e. light-transparent glass, or, for instance when employed as a covering for the facade of building structure, in pigmented condition.

As the "acrylate plastic," numerous materials are known. These include homopolymers of acrylate and methacrylate esters, such as polymethyl methacrylate, as well as copolymers of two or more of these monomers, e.g. copolymers of methyl methacrylate with other acrylate (including methacrylate) comonomers. For example, the following monomers are used: ethylmethacrylate, propolymethacrylate, methylmethacrylate, methylacrylate, ethylacrylate, cyclohexylacrylate or methacrylate, benzylacrylate or methacrylate, or ethyleneglycol monomethylacrylate. The use of halophenyl acrylates and methacrylates as comonomers for introducing halogen atoms into an acrylate by copolymerization has been discussed earlier herein.

Other acrylate copolymers include those predominantly based on methyl methacrylate but including vinyl or vinylidene comonomers other than acrylates, such as vinyl chloride and vinylidene chloride, vinyl acetate, styrene, α-methyl styrene, vinyltoluene, and the like.

Still further, mixed polymers of methyl methacrylate and acrylonitrile and/or methacrylonitrile are useful. Polymers based on these last two monomers may have the acrylate units equivalent to the nitrile units or even less than the nitrile units. Polymethacrylonitrile is also useful.

The above homopolymers or copolymers may also be employed if modified by addition of cross-linking agents such as divinylbenzene, glycoldimethacrylate, allylacrylate and methacrylate, triallylcyanurate, tetraglycol dimethacrylate, etc. These cross-linking monomers are added in amounts such that the thermoplastic nature of the polymer is maintained.

The acrylate plastic to be used in accordance with the invention will only rarely be used in the form of flat boards; rather the stretched material will be shaped into three-dimensional structures in order to obtain the necessary intrinsic stiffness. As has been described in detail, for instance, in "Kunststoffe," No. 4, p. 178 (1962), it has been found advisable in this connection to effect the secondary shaping (for instance the development of a spherical segment by means of compressed air) directly after the stretching process so that only a single heating is necessary. That the cooling of the shaped structure must take place while maintaining the pressure and while holding the edges in order to prevent a retraction of the material does not required further explanation. The mechanical properties of thermoplastic resins are, as is known, improved also by the orientation of the macromolecules upon monoaxial stretching. Although theoretically the effect of favorable fire resistance obtainable in accordance with the present invention can be achieved when using monoaxially stretched material, this procedure, in view of the mechanical behavior of such shaped bodies, must be considered as a poor embodiment of the invention, but one which, nevertheless, falls under the scope of the same.

What is claimed is:

1. As an article of manufacture, a structural element which is a supported difficultly-inflammable homopolymer of methyl methacrylate or a copolymer predominantly comprising methyl methacrylate, the homopolymer or copolymer in said element being biaxially stretched from 30 to 80 percent and containing therein a member selected from the group consisting of (1) a flame-inhibiting phosphorus compound in combination with a phosphorus-free flame-inhibiting organohalogen compound and (2) a flame-inhibiting halophosphorus compound, in which organohalogen or halophosphorus compound the halogen is chlorine or bromine, said member being present in said homopolymer or copolymer in an amount such that the content of phosphorus, as elemental phosphorus, is at least 0.8 percent by weight of said homopolymer or copolymer and the content of halogen is at least 1.2 percent, in the case of chlorine, or at least 2.5 percent, in the case of bromine, by weight of said homopolymer or copolymer, the difficultly-inflammable biaxially stretched homopolymer or copolymer in said structural element exhibiting the characteristic property of cracking and shrinking toward its support when exposed to intense heat and flame.

2. A structural element as in claim 1 comprising a halophosphorus compound.

3. A structural element as in claim 1 which is a copolymer comprising a chlorine or bromine compound as a comonomer component of said copolymer.

4. A structural element as in claim 3 wherein said phosphorus compound is selected from the group consisting of phosphoric acids, phosphorous acid, and alkyl and aryl esters of phosphoric acids.

5. A structural element, as in claim 3, wherein said chlorine or bromine compound is selected from the group consisting of vinyl chloride, vinylidene chloride, and halophenyl acrylates and methacrylates.

6. A structural element as in claim 1 comprising both chlorine and bromine compounds in an amount such that the amount of halogen present is at least equal to 1.2+0.013Br, percent by weight of said homopolymer or copolymer, where Br is the percent by weight of bromine in the total halogen present.

7. A structural element as in claim 1 wherein said halophosphorus compound is selected from the group consisting of the halo lower alkyl phosphates, and polyphosphates having the formula

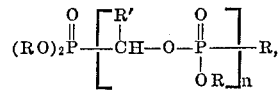

wherein R is haloalkyl containing 2 or 3 carbon atoms and 1 or 2 chlorine or bromine atoms, R' is hydrogen or alkyl having 1–3 carbon atoms, and $n$ is an integer from 1 to 3.

8. A structural element as in claim 1 wherein an organohalogen compound is present as a second polymer admixed with said homopolymer or copolymer, in an amount from 10 to 20 percent by weight of said homopolymer or copolymer.

9. A structural element as in claim 8 wherein said second polymer comprises vinyl chloride or vinylidene chloride.

References Cited

UNITED STATES PATENTS

| | | | |
|---|---|---|---|
| 2,272,668 | 2/1942 | Honel | 260—75 |
| 3,075,928 | 1/1963 | Lanham | 260—2.5 |
| 3,118,960 | 1/1964 | Cook | 264—230 |
| 3,441,633 | 4/1969 | Friedman | 260—927 |
| 3,522,331 | 7/1970 | Dever et al. | 260—937 |
| 2,610,978 | 9/1952 | Lanham | 260—963 |
| 2,856,634 | 10/1958 | Ames | 264—93 |
| 3,030,327 | 4/1962 | Hosch | 260—30.6 |
| 3,162,613 | 12/1964 | Tousignant | 260—45.7 |
| 3,294,710 | 12/1966 | Rosenberg et al. | 260—2.5 |
| 3,294,730 | 12/1966 | Jukes | 260—30.6 |
| 3,294,873 | 12/1966 | Lutz et al. | 260—929 |
| 3,313,867 | 4/1967 | Blackburn et al. | 260—895 |
| 3,468,980 | 9/1969 | Forsyth | 260—901 |
| 3,574,149 | 4/1971 | Harrington | 260—2.5 |
| 3,595,819 | 7/1971 | Dakli et al. | 260—23 |

OTHER REFERENCES

Monsanto Bulletin, "Phosgard C-22-R," 1965, p. 6.

DONALD E. CZAJA, Primary Examiner

R. A. WHITE, Assistant Examiner

U.S. Cl. X.R.

260—45.7 P, 45.7 R, 86.1 E, 86.3; 260—230, 289